United States Patent
De Santis et al.

(10) Patent No.: US 10,108,444 B2
(45) Date of Patent: *Oct. 23, 2018

(54) MANAGING VIRTUAL MACHINE POLICY COMPLIANCE

(71) Applicant: International Business Machines Corporation, Armonk, NY (US)

(72) Inventors: Marco De Santis, Rome (IT); Luigi Pichetti, Rome (IT); Marco Secchi, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,371

(22) Filed: May 25, 2017

(65) Prior Publication Data
US 2017/0262302 A1 Sep. 14, 2017

Related U.S. Application Data (63) Continuation of application No. 14/303,343, filed on Jun. 12, 2014, now Pat. No. 9,697,025.

(30) Foreign Application Priority Data

Jul. 2, 2013 (GB) .................................. 1311807

(51) Int. Cl.
*G06F 9/455* (2018.01)
(52) U.S. Cl.
CPC ...... *G06F 9/45533* (2013.01); *G06F 9/45558* (2013.01); *G06F 2009/45587* (2013.01)
(58) Field of Classification Search
CPC .................................................. G06F 9/45533
USPC ......................................................... 718/1
See application file for complete search history.

(56) References Cited

U.S. PATENT DOCUMENTS

| | | | |
|---|---|---|---|
| 8,181,025 B2 | 5/2012 | Savagaonkar et al. |
| 8,214,878 B1 | 7/2012 | Hernacki et al. |
| 8,234,641 B2 | 7/2012 | Fitzgerald et al. |
| 8,443,077 B1 | 5/2013 | Lappas et al. |
| 8,452,921 B1 | 5/2013 | Li et al. |
| 8,479,211 B1 | 7/2013 | Marshall et al. |
| 8,949,825 B1 | 2/2015 | Fitzgerald et al. |
| 2008/0134175 A1 | 6/2008 | Fitzgerald et al. |
| 2008/0134177 A1 | 6/2008 | Fitzgerald et al. |
| 2008/0184225 A1 | 8/2008 | Fitzgerald et al. |
| 2008/0222638 A1 | 9/2008 | Beaty et al. |
| 2008/0263658 A1 | 10/2008 | Michael et al. |

(Continued)

FOREIGN PATENT DOCUMENTS

JP 2012510650 A 5/2012

OTHER PUBLICATIONS

Berger et al., "TVDc: Managing Security in the Trusted Virtual Datacenter," IBM Research Report RC24441 (W0711-219), Nov. 2007, 9 pages.

(Continued)

*Primary Examiner* — Mehran Kamran
(74) *Attorney, Agent, or Firm* — Yee & Associates, P.C.; Jeffrey LaBaw (57) ABSTRACT

A method for managing virtual machine policy compliance. The method for restoring compliance of a virtual machine found to be non-compliant to a compliance rule may comprise detecting non-compliance of a virtual machine using a compliance agent, detaching the virtual machine from a network, creating a copy of a compliance repository volume, mounting the newly requested disk resource having stored the copy of the compliance repository volume, applying a remediation action to the virtual machine, and triggering by the compliance agent a compliance scan for ensuring that the virtual machine complies to the compliance rule.

20 Claims, 6 Drawing Sheets

(56) References Cited

U.S. PATENT DOCUMENTS

| | | |
|---|---|---|
| 2009/0007100 A1 | 1/2009 | Field et al. |
| 2010/0017512 A1 | 1/2010 | Ciano et al. |
| 2010/0058432 A1 | 3/2010 | Neystadt et al. |
| 2010/0251252 A1 | 9/2010 | Laverone et al. |
| 2011/0197189 A1 | 8/2011 | Wagner et al. |
| 2011/0225624 A1 | 9/2011 | Sawhney et al. |
| 2012/0174096 A1 | 7/2012 | Conover |
| 2012/0246647 A1 | 9/2012 | Ciano et al. |
| 2012/0311344 A1 | 12/2012 | Sabin et al. |
| 2013/0054979 A1 | 2/2013 | Basmov et al. |
| 2013/0061219 A1 | 3/2013 | Jerbi et al. |
| 2015/0012920 A1 | 1/2015 | De Santis et al. |

OTHER PUBLICATIONS

"Agentless Security for VMware Virtual Data Centers and Cloud," A Trend Micro White Paper, Trend Micro, Incorporated, copyright 2012, 16 pages. http://trendmicro.com/cloud-content/us/pdfs/business/white-papers/wp_changing-the-game-for-antivirus-vmware.pdf.

"Next Generation Security and Compliance for Virtual and Cloud Data Centers," Red Hat, Inc., Jan. 2012, 4 pages. http://marketplace.redhat.com/resources/attach/original/425?1326725580.

"Securing Virtualised Datacentres," A Trend Micro eBook, Trend Micro, Incorporated, copyright 2010, 19 pages. http://trendmicro.com.my/my/pdf/Secure_Virtualization.pdf.

Office Action, dated Aug. 24, 2015, regarding U.S. Appl. No. 14/303,343, 21 pages.

Final Office Action, dated Jan. 29, 2016, regarding U.S. Appl. No. 14/303,343, 22 pages.

Notice of Allowance, dated Feb. 27, 2017, regarding U.S. Appl. No. 14/303,343, 12 pages.

MANAGING VIRTUAL MACHINE POLICY COMPLIANCE

CROSS-REFERENCE TO RELATED APPLICATIONS

This application is a continuation of and claims the benefit of priority to U.S. patent application Ser. No. 14/303,343, filed Jun. 12, 2014, which claims the benefit of priority to United Kingdom Patent Application No. GB1311807.0, filing date Jul. 2, 2013. The contents of both aforementioned applications are hereby incorporated by reference.

FIELD OF THE INVENTION

The invention relates generally to a method for managing virtual machine policy compliance. The invention relates further to a system for managing virtual machine policy compliance, a computing system, a data processing program, and a computer program product.

BACKGROUND OF THE INVENTION

Cloud computing and virtualization have been playing a key role in recent years among the technologies adopted in information technology solutions for designing, maintaining and operating data centers.

As physical servers and workstations, even virtualized computing resources, need to comply with certain company policies regarding software configuration and security, lots of software products and solutions that help IT administrators to monitor policy compliance of data centers are on the market.

Typically, IT administrators, security auditors and other professionals that are responsible for policy compliance may receive reports from those tools that may highlight the computers which may violate defined compliance rules or may also highlight some other constraints, so that the administrators may take an action to resolve the issue. Typically, the resource that may be marked as not-compliant by the tool with the defined compliance rules may need to be detached from the company network in order to prevent the diffusion of the problem, like viruses, worms, spyware, etc.

Working with a machine not attached to the company network can be very difficult and may require IT professionals to physically stand in front of the failing system and log-in to resolve potential problems. Moreover, patching tools are often centralized in the data center or company repositories, and thus not available without a network connection.

There are some disclosures related to a method for managing virtual machine (VM) policy compliance.

Document U.S. Pat. No. 8,234,641 B2 discloses techniques for controlling and managing virtual machines. In one particular embodiment, a systems management partition is created inside the virtual machine to provide a persistent and resilient storage for management information. The VM management information can be made available for pre-execution processing, including policy-based compliance testing.

Document US 2010/0017512 A1 discloses a compliance test, during which an identified VM image is controlled such that it cannot connect to the network. One or more tests are carried out to determine if the virtual machine is compliant with one or more predetermined requirements. If a VM is compliant with said one or more predetermined requirements, the VM image is connected to the network.

However, these solutions have limitations in the way compliance detection is performed and network connections are handled. Therefore, there is a need for an improved mechanism for restoring compliance of a VM found to be non-compliant.

SUMMARY OF THE INVENTION

This need may be addressed by a method for restoring compliance of a virtual machine found to be non-compliant to a compliance rule, a related compliance system, a computing system, a data processing program, and a computer program product according to the independent claims.

(1) According to one embodiment, a method for restoring compliance of a VM found to be non-compliant to a compliance rule may be provided. The method may comprise, detecting non-compliance of a VM with the compliance rule using a compliance agent. The compliance agent may be deployed on the VM. Additionally, the existing VM may be detached or disconnected from a network. A copy of a compliance repository volume—in particular, a copy of a compliance repository shared service volume—may be created. This copy may be available on a newly requested disk resource for the VM. Moreover, the disk resource having stored the copy of the compliance repository volume may be mounted—in particular logically mounted—to the VM. A remediation action may be applied to the VM using content of the copy of the compliance repository volume for restoring back compliance of the VM, meaning, reverting it back to a compliant state. Furthermore, another compliance scan may be triggered by the compliance agent for ensuring that the VM may comply with the compliance rule.

(10) According to another embodiment, a compliance system for restoring compliance of a VM found to be non-compliant to a compliance rule may be provided. The compliance system may comprise a compliance detecting unit adapted for detecting non-compliance of a VM with the compliance rule using a compliance agent being deployed on the VM, and a detaching unit adapted for detaching the existing VM from a network. Furthermore, the compliance system may comprise a copy creation unit adapted for creating a copy of a compliance repository volume on a newly requested disk resource for the VM, a mounting unit adapted for mounting the disk resource having stored the copy of the compliance repository volume to the VM, and an applying unit adapted for applying a remediation action to the VM using content of the copy of the compliance repository volume for reverting back the VM to a compliant state. Additionally, the compliance system may comprise a triggering unit adapted for triggering by the compliance agent a compliance scan for ensuring that the VM may comply with the compliance rule.

It may be noted that the virtual machine may typically be executed on a server system in a data center. However, the VM may also be deployed on a personal computing device such as a PC, a tablet or any other mobile device.

DETAILED DESCRIPTION

In the context of this description, the following conventions, terms and/or expressions may be used:

The term "compliance" of a computer system or a VM may denote that the related system may be aligned with a set of rules in terms of its configuration and/or software that may be installed and/or executed. It may also concern data access rules, users allowed to access the system, potential malware and/or any other rule ensuring a secure operation of the computing system. In this sense, the term non-compliance may denote a status in which the related system may not adhere to any of the one or more predefined compliance rules. A system may thus be in a compliant state if the system operates according to the predefined compliance rules.

The term "compliance agent" may denote a set of functions—in particular implemented in software or hardware—checking features and functions of the related system to ensure that the predefined one or more compliance rules are met.

The term "compliance repository volume" may denote a storage volume—in particular a spinning, magnetic disk or another memory system—e.g., a solid state disk—having stored a version of the VM which may adhere to the compliance rules. Additional configuration information, like scripts, middleware or application software may also be stored on the compliance repository volume. Basically, a complete set of a predefined software stack defining the VM with all its aspects may be available from the compliance repository volume. This may include the VM as a basis but also software applications that may be installed on the VM.

The term "remediation action" may denote one or more actions required to bring the System—in particular the VM—back to a status at which it may be in accordance with the compliance rules defined, i.e., to a compliant status.

The term "storage system" may denote a device being adapted to store data, e.g., scripts, complete or base VMs, application software and/or any other data. The storage system may comprise a specific storage controller which may be part of a host computer or may be deployed stand-alone.

The term "hypervisor" may denote a piece of computer software, firmware or hardware that may create and run VMs. A computer on which a hypervisor may run one or more VMs may be defined as a host machine. Each VM may be is called "guest machine". The hypervisor may present the guest operating systems with a virtual operating platform and may manage execution of the guest operating systems. Multiple instances of a variety of operating systems may share the virtualized hardware resources. More than one hypervisor may be deployed on one physical server.

The proposed method for restoring compliance of a VM found to be non-compliant to a compliance rule may offer a couple of advantages:

The compliance test may be performed using an agent running in a VM. Since more than one VM may run on a hypervisor on a physical hardware, it may be possible to control and supervise compliance according to compliance rules individually per VM. Remediation actions may be different from VM to VM on the same hypervisor and/or physical hardware. Even if the compliance agent may be corrupted on one VM, the related compliance agents on parallel VMs may still be intact. VMs may also be supervised, i.e., checked for compliance, using different compliance rules.

Additionally, the process of restoring compliance of a VM may be completely independent of any communication network connection. The VM and its compliance test may be—so to speak—self optimized and independent of network resources. No downloading of compliance testing software or content via a communication network may be required at all. If non-compliance of a VM may be detected—in particular, by a compliance scan by the compliance agent—the compliance agent may initiate a separation or detachment of the VM from the network, e.g., an enterprise or datacenter network. Now, the VM may be a standalone and may repair itself without a requirement to re-install the VM another time. Such re-instantiation may be typical for state-of-the-art compliance tests. With the here provided method, such a re-instantiation may not longer be required.

A compliance repository volume, which may be attached to the physical server supporting hypervisor and thus related virtual machines via a storage channel, may be copied "on-the-fly"—meaning during operation of the VM and its application programs—to a disk resource that may have been requested by the compliance agent via the hypervisor. The additional disk resource may be available from the storage disk being attached to the physical hardware on which the VM runs. A storage system or storage sub-system may perform the copy process. Thus, the copy may be performed independent from the non-compliant VM. Moreover, the compliance repository volume may have faced any risk of being corrupted by malware running on the VM. All tests and remediation actions may be based on using the copy of the compliance repository volume on another—the newly requested—disk resource. Thus, the proposed method and system may bring back the VM to a compliant state without an active connection to a network using the agent running on the VM itself, a self-protecting copy of a compliance repository volume, active remediation actions and a reconnect of the VM to the network. All checks and actions may be performed "live" on the active VM and not before a VM is brought to life, i.e., instantiated, initialized and connected, or shut down. The present disclosure may ensure compliance permanently throughout the lifetime of the VM.

Additionally advantageously may be the following aspects: By detaching the VM from the network during restoring compliance, the risk of spreading the root cause of the non-compliancy of the VM over the virtual data center is highly mitigated. The malfunction may stay local and may be repaired fast.

And by attaching the compliance repository to the failing, i.e. non-compliant, VM all centrally available tools and resources needed to restore compliance (software bundles, scripts, etc) are immediately available. It may not be required to choose and select necessary tools from the "repair shop", i.e., a repair tool set.

Hence, since the repository is centralized per physical (server) system, only this single instance may have to be maintained for all potential VMs being deployable on the server when compliance rules are modified.

According to one embodiment, the method may also comprise detaching the disk resource having stored the copy of the compliance repository volume from the virtual machine. Such a detachment may occur after performing the remediation actions or after triggering the newly performed compliance scan. This way, it may be ensured that the disk space may no longer be occupied. It may be released again for other purposes.

According to a further embodiment of the method, the method also comprises, Removing—in particular deleting—the copy of the compliance repository volume on the newly requested disk resource. Such a deletion from the storage system may release disk space to be used for other purposes. It may be performed by the storage system under control of the hypervisor triggered by the compliance agent.

According to just a further embodiment of the method, the removing of the copy of the compliance repository volume may comprise releasing—in particular deleting—the newly requested disk resource. Again, such an action as part of a clean-up process may free up all no longer required resources which may only be required during a process of restoring compliance of a VM.

According to just another embodiment, the method may also comprise attaching back the virtual machine to the network. After such an operation, the VM may again be fully functional within the context of a data center. No further bottleneck may be expected. Such a re-attaching back to the computer network may be performed after the compliance scan that may have been performed after the remediation action. This way, it may be ensured that only compliant system may be attached to the network again. Potential risks due to security breeched or similar may not spread to other systems within a data center.

According to an advanced embodiment of the method, the creation of the copy of the compliance repository volume may be performed by a storage system. And moreover, the storage system may be controlled by the hypervisor. The hypervisor again may be triggered by the compliance agent. Thus, not any outside help and not any network connection may be required for the VM. Thus, a relatively good degree of system security may be achieved. Malware may have little chance to negatively influence the copying process.

According to a further enhance embodiment of the method, the detaching of the disk resource having stored the copy of the compliance repository volume and/or the removing the copy of the compliance repository volume and/or the releasing of the newly requested disk resource and/or the attaching back the VM to the network may be performed after applying the remediation action. Hence, the remediation action may be performed using the copy of the compliance repository volume and after that the required storage space may be freed-up again.

In one embodiment of the method, the remediation action may be performed by the compliance agent using at least one script and/or at least one software component stored on the copy of the compliance repository volume. In particular, a non-compliant software component of the VM, or a non-compliant software component running as application on the VM may be removed and/or may be replaced by a corresponding compliant software component from the copy of the compliance repository volume. Alternatively, the non-compliant software component may be adjusted, e.g., configuration parameters may be reset or re-aligned, to comply again with the at least one compliance rule. This way, configuration parameters and software components may be set back to a state which may be compliant with the compliant rule(s). Alternatively, non-compliant or not allowed software components or configurations may be replaced, disabled or deleted from the VM.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

BRIEF DESCRIPTION OF THE DRAWINGS

Preferred embodiments of the invention will now be described, by way of example only, and with reference to the following drawings.

DETAILED DESCRIPTION OF EXEMPLARY EMBODIMENTS

In the following, a detailed description of the figures will be given. All instructions in the figures are schematic. Firstly, a block diagram of an embodiment of the disclosed method for restoring compliance of a VM found to be non-compliant is given. Afterwards, further embodiment details of the method and a compliance system for restoring compliance of a VM found to be non-compliant will be described.

Figure 1:
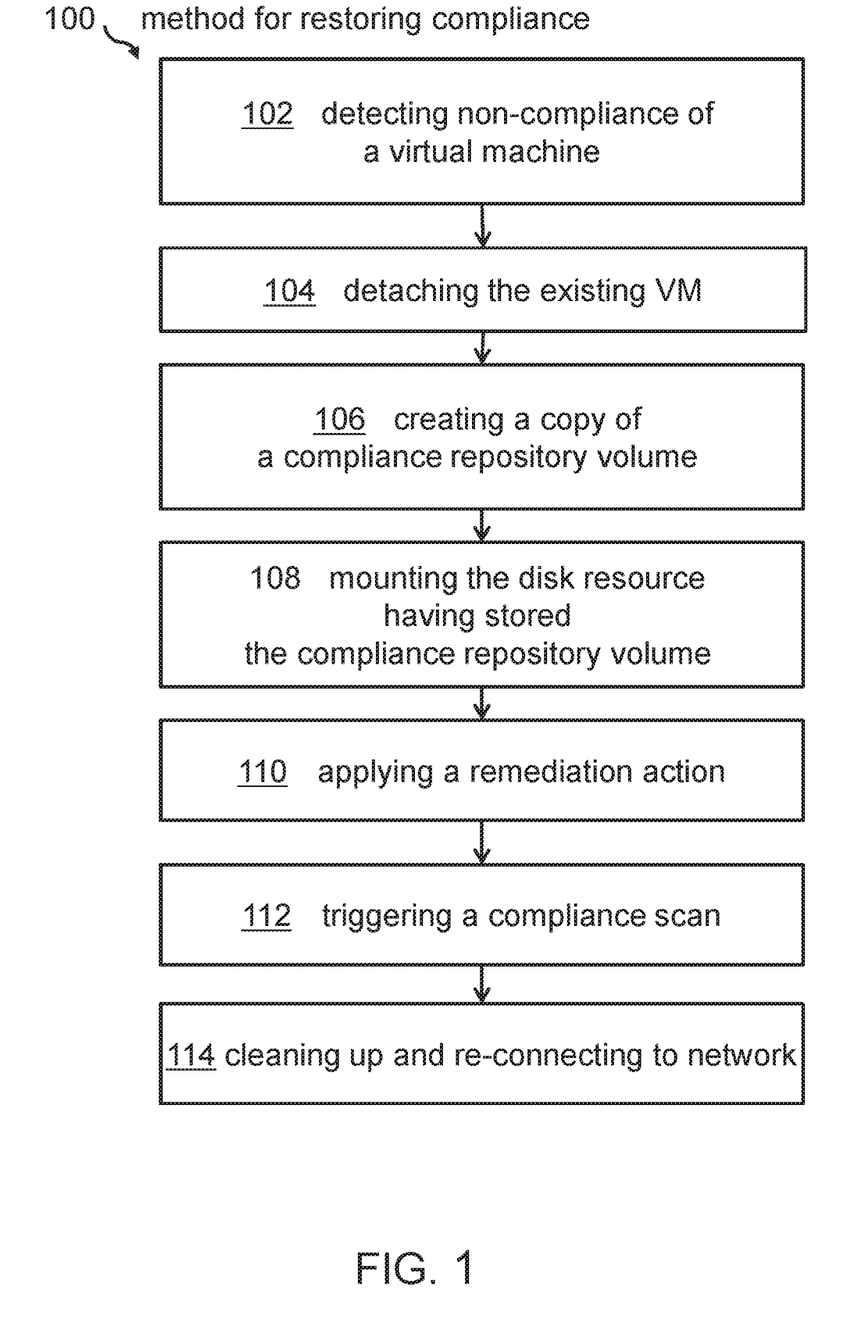
FIG. 1 shows a block diagram of an embodiment of the method for restoring compliance of a VM found to be non-compliant.

FIG. 1 shows a block diagram of an embodiment of the method for restoring compliance of a VM found to be non-compliant. As shown in the diagram 100 the method may comprise detecting, 102, non-compliance of a VM with the compliance rule. This may be performed, in particular, by a triggering a compliance scan using a compliance agent being deployed on the VM. Thus, the compliance agent may be implemented as an application program running on the VM. The method may also comprise detaching, 104, the existing VM from a network. This may be an active method step controlled by the compliance agent.

Moreover, the method may comprise creating, 106, a copy—in particular, "on the fly", i.e. during the system being live and active—of a compliance repository volume, in particular, a compliance repository shared service volume. Such a volume may be available per physical server and may be shared among different VMs on the same physical system. Not any network connection may be required to access this compliance repository volume. The copy may be made to a newly requested disk resource for the VM. In particular, a storage manager (not shown) controlled by the hypervisor may create, 106, the copying. The hypervisor may be triggered by the compliance agent.

Additionally, the method may comprise mounting, 108, in particular logically, the disk resource having stored the copy of the compliance repository volume to the VM which may not be in the compliant state at this point in time.

Last but not least, one or more remediation actions may be applied, 110, to the VM using content of the copy of the compliance repository volume. This way, compliance may be restored back to the VM. The content may comprise scripts, check lists, test rules, predefined remediation actions and/or software bundles required to restore compliance of the VM. The content may be stored on the compliance repository volume.

Moreover, the method may comprise triggering, 112, by the compliance agent, a compliance scan for ensuring that the VM complies with the compliance rule. This additional compliance scan may be seen as an assurance step of the method. However, this way, it may be achieved that compliance may really be restored and not only assumed by running the software on the compliance repository volume. Here, an active test belongs to the components of the method. Once compliance may be restored, the VM may be attached back to the network.

Optionally, the method may comprise additional steps 114, like cleaning up disk space and connecting the VM back to the network. E.g., the detaching the disk resource having stored the copy of the compliance repository volume from the VM may be performed. The removing the copy of the compliance repository volume on the newly requested disk resource may also be part of the disclosed method.

Figure 2:
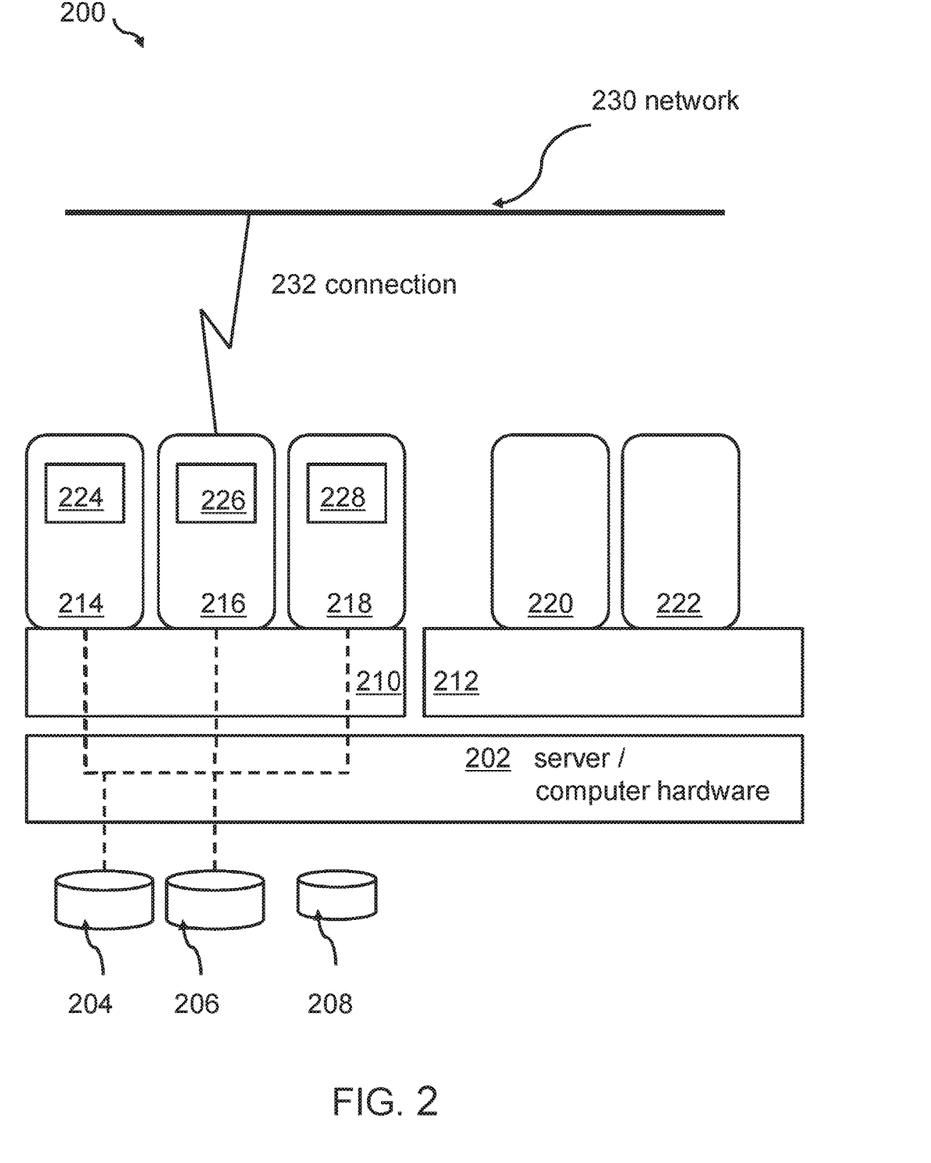
FIG. 2 shows a block diagram of a potential configuration of a hypervisor, a VM, a compliance agent and a storage system.

FIG. 2 shows a block diagram of a potential configuration of a hypervisor 210, 212, a VM 214, 216, 218, a compliance agent 224, 226, 228 and storage systems or disk systems 204, 206. A datacenter (not shown) may comprise computer hardware 202 like a server. However, the method may also be performed on a mobile device or a PC, as mentioned above. On the hardware one or more hypervisors 210, 212 may be installed and being active as a platform for VMs 214, 216, 218 for hypervisor 210, and VMs 220, 222 for hypervisor 212. As an example, disk systems 204 and 206 may be attached to or may be part of the computer hardware. Alternatively, the disk systems may be independently controlled as a component of a storage subsystem which may be attachable to the server 202 via a dedicated storage channel (storage subsystem and storage channel not explicitly shown). Disk 208 will be discussed in the context of FIG. 3.

VM 216—as well as the other VMs (not shown)—may also be connected via connection 232 to a network 230, e.g., a datacenter or enterprise network, or a wide area network. The connection may be established via the computer hardware, as a skilled person would know. On each VM 214, 216, 218, a separate compliance agent 224, 226, 228 may be deployed beside other software programs (not shown). The network 230 may be a dedicated communication network.

Figure 3:
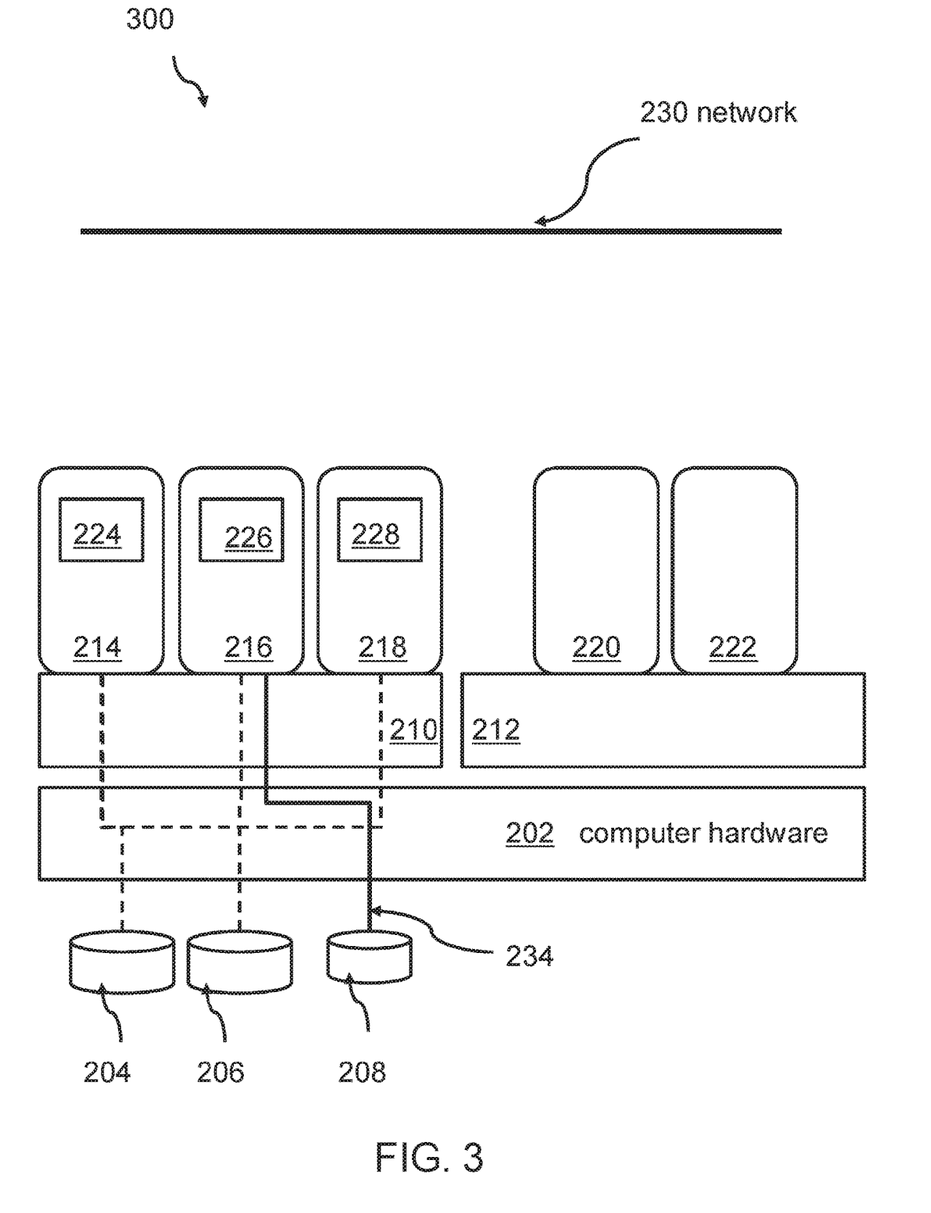
FIG. 3 shows a block diagram of the configuration of FIG. 2 with a compliance repository volume attached.

FIG. 3 shows a block diagram of the configuration of FIG. 2 with a compliance repository volume attached. In case, e.g., compliance agent 226 may detect a non-compliance, as discussed in context of FIG. 1, the network connection 232 from FIG. 2 may disappear because of a disconnect of the VM 216 from the network 230. Additionally, the disk 208 which may be a compliance repository volume, may—by example—be mounted to VM 216 via connection 234. The additional steps, as discussed in the context of FIG. 1, may now be performed, e.g., an on-the-fly copy of the compliance repository volume 208 to a newly—in particular, virtually—requested disk resource. Free space on one of the disk systems 204 and/or 206 may be used for that purpose. For the actual remediation action the compliance repository volume 208 may then no longer be required. The compliance repository volume 208 may be shared among all VMs 214, 216, 218 of the hypervisor 210. For the hypervisor 212 a comparable configuration maybe installed. Actually, the compliance repository volume 208 may be shared between physical servers 208 using a storage subsystem with dedicated storage channels. Such a dedicated storage channel(s) may exist in addition to normal communication network connections. In case the physical server 202 may be a PC or similar (see above) not comprising a dedicated storage channel, the compliance repository volume 208 may be attached individually to the physical server 208 without using a communication network, e.g., by using a USB-port or by having the compliance repository volume 208 as a protected portion of an existing disk "on board" of the PC.

Figure 4:
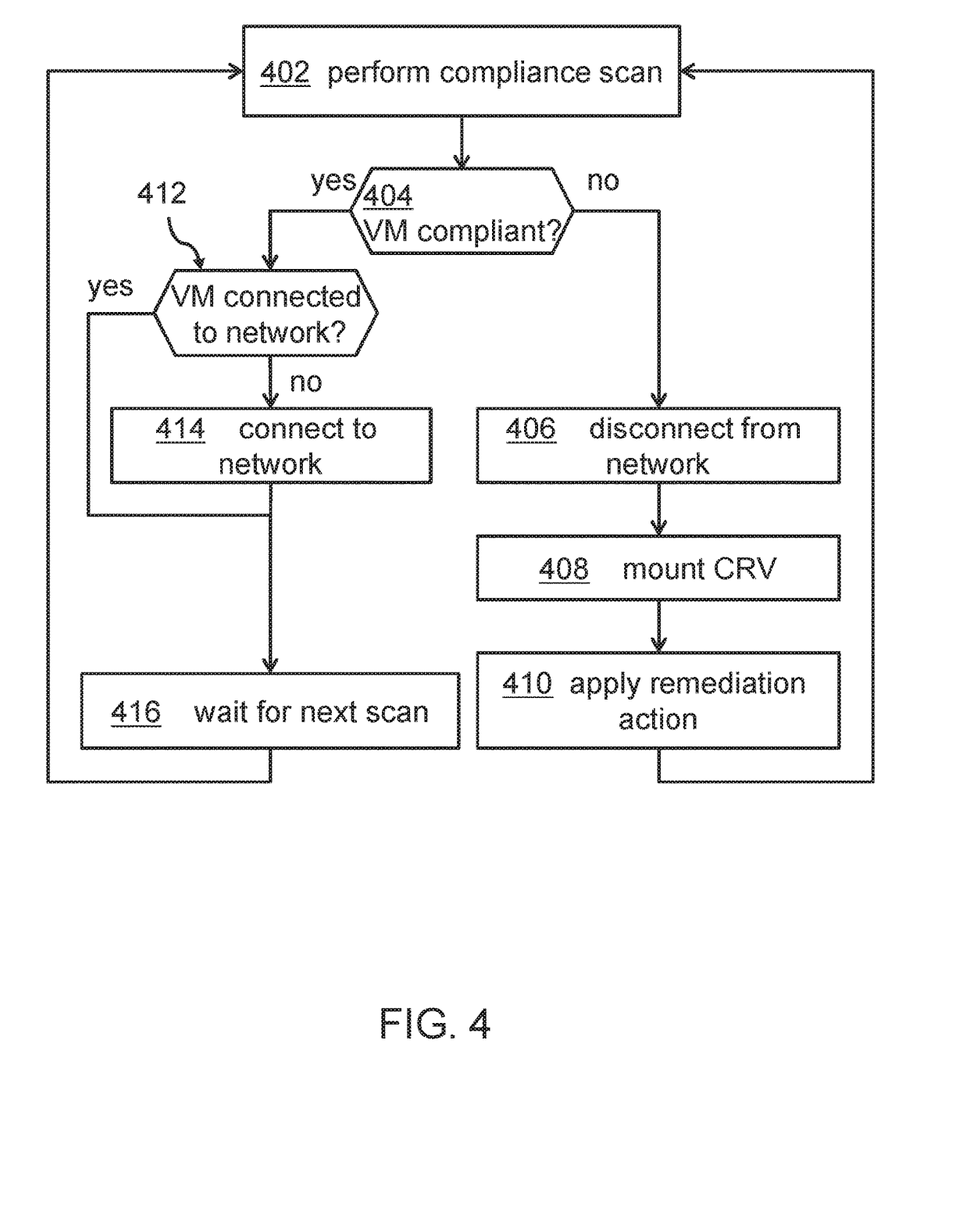
FIG. 4 shows a block diagram of the method according FIG. 1 in more detail.

FIG. 4 shows a block diagram of the method according FIG. 1 in more detail. Initially, a compliance scan may be performed, 402. A test may be run, whether or not the related VM may be compliant, 404. In case of "yes", it may be checked whether the VM is connected to the network, 412. In case of "no", the VM may be connected to the network, 414. If the test 412 results in a "yes", the system may wait for the next compliance scan, 416.

If, in contrast, the test 404 may result in a "no", the VM may be disconnected from the network, 406, a compliance repository volume may be mounted 408, and at least one remediation action may be performed, 410. After that, a new compliance scan may be performed, 402. All these activities may be controlled by the compliance agent running on the VM ensuring compliance control.

Figure 5:
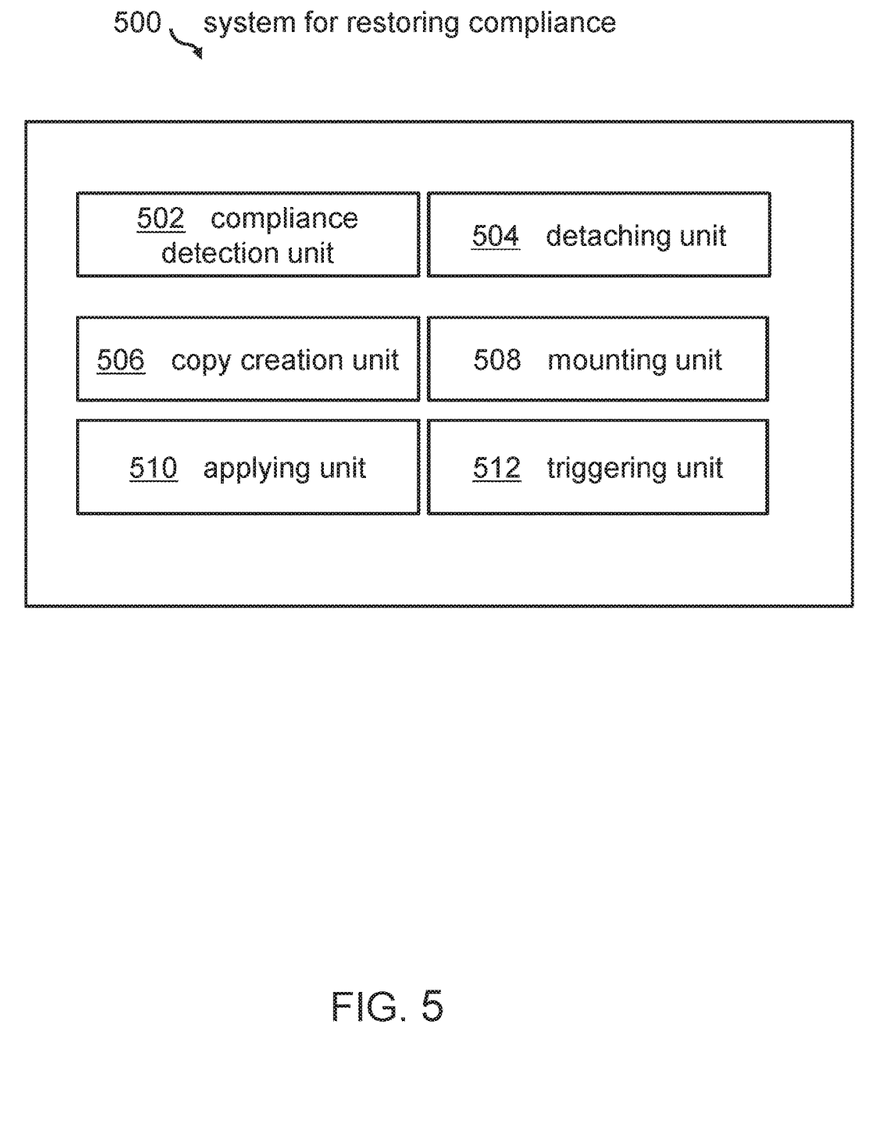
FIG. 5 shows an embodiment of a compliance system.

FIG. 5 shows an embodiment of a compliance system 500. The compliance system 500 for restoring compliance of a VM found to be non-compliant to a compliance rule, may comprise a compliance detection unit 502 adapted for detecting non-compliance of a VM with the compliance rule using a compliance agent being deployed on the VM, and a network detaching unit 504 adapted for detaching the existing VM from a network.

Moreover, the compliance system 500 may comprise a copy creation unit 506 adapted for creating a copy of a compliance repository volume on a newly requested disk resource for the VM, and amounting unit 508 adapted for mounting the disk resource having stored the copy of the compliance repository volume to the VM.

Furthermore, the compliance system—as shown—may comprise an applying 510 unit adapted for applying a remediation action to the VM using content of the copy of the compliance repository volume creating for reverting back the VM to a compliant state, as well as a triggering unit 512 adapted for triggering, by the compliance agent, a compliance scan for ensuring that the VM complies to the compliance rule. Accordingly, all required components may be realized in hardware components.

Figure 6:
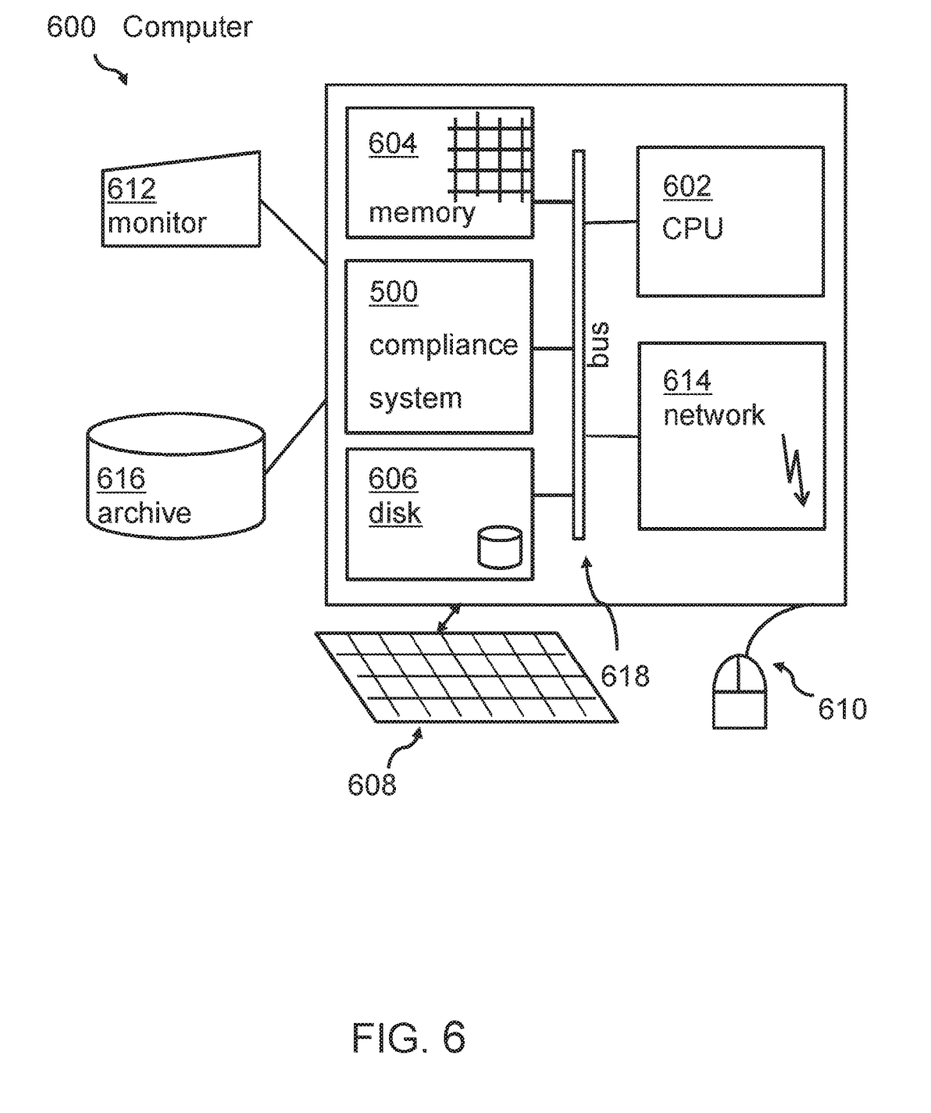
FIG. 6 shows a block diagram of a computing system comprising the compliance system.

FIG. 6 shows a block diagram of a computing system 600 with typical elements also comprising the compliance system 500.

Embodiments of the invention may be implemented together with virtually any type of computer, regardless of the platform being suitable for storing and/or executing program code. For example, as shown in FIG. 6, a computing system 600 may include one or more processor(s) 602 with one or more cores per processor, associated memory elements 604, an internal storage device 606 (e.g., a hard disk, an optical drive such as a compact disk drive or digital video disk (DVD) drive, a flash memory stick, a solid-state disk, etc.), and numerous other elements and functionalities, typical of today's computers (not shown). The memory elements 604 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage (archive 616) for an execution. Elements inside the computer 600 may be linked together by means of a bus system 618 with corresponding adapters. As shown, the system for restoring compliance may be attached to the bus system 618. The computing system 600 may be a server or a PC or any other mobile device. There may also be an external disk subsystem provided (not shown) which may be attachable to the computing device, e.g., the compliance repository volume 208. Special adapters may be required for such an attachment of a storage subsystem comprising disk systems.

The computing system 600 may also include input means, such as a keyboard 608, a pointing device such as a mouse 610, or a microphone (not shown). Alternatively, the computing system may be equipped with a touch sensitive screen as main input device. Furthermore, the computer 600, may include output means, such as a monitor or screen 612 [e.g., a liquid crystal display (LCD), a plasma display, a light emitting diode display (LED), or cathode ray tube (CRT) monitor]. The computer system 600 may be connected to a network (e.g., a local area network (LAN), a wide area network (WAN), such as the Internet or any other similar type of network, including wireless networks via a network interface connection 614. This may allow a coupling to other computer systems or a storage network or a tape drive. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A method for restoring compliance of a virtual machine found to be non-compliant to a compliance rule, the method comprising
    detecting non-compliance of the virtual machine with the compliance rule using a compliance agent deployed on the virtual machine;
    detaching the virtual machine from a network;
    creating a copy of a compliance repository volume on a requested disk resource for the virtual machine, wherein the compliance repository volume has stored thereon a version of the virtual machine which adheres to the compliance rule;
    responsive to detecting the non-compliance of the virtual machine, mounting the requested disk resource, having stored thereon the copy of the compliance repository volume, to the virtual machine;
    responsive to mounting the requested disk resource, applying a remediation action to the virtual machine using content of the copy of the compliance repository volume to restore compliance of the virtual machine;
    responsive to applying the remediation action to the virtual machine, triggering, by the compliance agent, a compliance scan to ensure that the virtual machine complies with the compliance rule; and
    responsive to ensuring that the virtual machine complies with the compliance rule, attaching the virtual machine back to the network.

2. The method according to claim 1, further comprising:
    responsive to triggering the compliance scan, detaching the requested disk resource having stored the copy of the compliance repository volume from the virtual machine.

3. The method according to claim 2, wherein the detaching of the requested disk resource is performed after applying the remediation action.

4. The method according to claim 1, further comprising:
    removing the copy of the compliance repository volume on the requested disk resource.

5. The method according to claim 4, wherein the removing the copy of the compliance repository volume comprises releasing the requested disk resource.

6. The method according to claim 1, wherein the creation of the copy of the compliance repository volume is performed by a storage system controlled by a hypervisor.

7. The method according to claim 6, wherein the creation of the copy of the compliance repository volume is triggered by the compliance agent via the hypervisor.

8. The method according to claim 1, wherein the remediation action is performed by the compliance agent using at least one script and/or at least one software component stored on the copy of the compliance repository volume.

9. A data processing program for execution in a data processing system, the data processing program comprising software code portions stored in a memory device for performing the method according to claim 1 when said data processing program is run on the data processing system.

10. The method according to claim 1, wherein the compliance repository volume comprises a storage volume having stored thereon a version of a compliant virtual machine that is compliant with the compliance rule, and the step of applying the remediation action to the virtual machine reverts the virtual machine back to a compliant state.

11. The method according to claim 10, wherein the compliance repository volume is copied on-the-fly during operation of the virtual machine to a disk resource requested by the compliance agent via the hypervisor in order to create the copy of the compliance repository volume.

12. The method according to claim 11, wherein the copy of the compliance repository volume is copied by a storage system such that the copy is performed independent from the virtual machine.

13. A compliance system adapted to restore compliance of a virtual machine found to be non-compliant to a compliance rule, the compliance system comprising a data processor coupled to a memory having instructions stored therein that are operable, when executed by the data processor, to perform steps of:
   detecting non-compliance of a virtual machine with the compliance rule using a compliance agent deployed on the virtual machine;
   detaching the virtual machine from a network;
   creating a copy of a compliance repository volume on a requested disk resource for the virtual machine, wherein the compliance repository volume has stored thereon a version of the virtual machine which adheres to the compliance rule;
   responsive to detecting the non-compliance of the virtual machine, mounting the requested disk resource, having stored thereon the copy of the compliance repository volume, to the virtual machine;
   responsive to mounting the requested disk resource, applying a remediation action to the virtual machine using content of the copy of the compliance repository volume to revert the virtual machine back to a compliant state;
   responsive to applying the remediation action to the virtual machine, triggering, by the compliance agent, a compliance scan to ensure that the virtual machine complies to the compliance rule; and
   responsive to ensuring that the virtual machine complies with the compliance rule, attaching the virtual machine back to the network.

14. The compliance system according to claim 13, wherein the compliance repository volume comprises a storage volume having stored thereon a version of a compliant virtual machine that is compliant with the compliance rule, and the step of applying the remediation action to the virtual machine reverts the virtual machine back to a compliant state.

15. The compliance system according to claim 14, wherein the compliance repository volume is copied on-the-fly during operation of the virtual machine to a disk resource requested by the compliance agent via the hypervisor in order to create the copy of the compliance repository volume.

16. The compliance according to claim 15, wherein the copy of the compliance repository volume is copied by a storage system such that the copy is performed independent from the virtual machine.

17. A computer program product stored on a non-transitory computer usable medium, comprising computer readable program code for causing a computer to perform steps of:
   detecting non-compliance of the virtual machine with the compliance rule using a compliance agent deployed on the virtual machine;
   detaching the virtual machine from a network;
   creating a copy of a compliance repository volume on a requested disk resource for the virtual machine, wherein the compliance repository volume has stored thereon a version of the virtual machine which adheres to the compliance rule;
   responsive to detecting the non-compliance of the virtual machine, mounting the requested disk resource, having stored thereon the copy of the compliance repository volume, to the virtual machine;
   responsive to mounting the requested disk resource, applying a remediation action to the virtual machine using content of the copy of the compliance repository volume to restore compliance of the virtual machine;
   responsive to applying the remediation action to the virtual machine, triggering, by the compliance agent, a compliance scan to ensure that the virtual machine complies with the compliance rule; and
   responsive to ensuring that the virtual machine complies with the compliance rule, attaching the virtual machine back to the network.

18. The computer program product according to claim 17, wherein the compliance repository volume comprises a storage volume having stored thereon a version of a compliant virtual machine that is compliant with the compliance rule, and the step of applying the remediation action to the virtual machine reverts the virtual machine back to a compliant state.

19. The computer program product according to claim 18, wherein the compliance repository volume is copied on-the-fly during operation of the virtual machine to a disk resource requested by the compliance agent via the hypervisor in order to create the copy of the compliance repository volume.

20. The computer program product according to claim 19, wherein the copy of the compliance repository volume is copied by a storage system such that the copy is performed independent from the virtual machine.

* * * * *